United States Patent [19]

Ban et al.

[11] Patent Number: 4,612,486
[45] Date of Patent: Sep. 16, 1986

[54] SEMICONDUCTOR ELECTRIC MOTOR HAVING A ROTARY TRANSFORMER TO EXCITE A ROTOR

[76] Inventors: Itsuki Ban, 3-50-18 Higashi Oizumi, Nerima-ku, Tokyo; Akihiro Nakajima, 9-8 Ichibayamato-cho, Tsurumi-ku, Yokohama-shi, Kanagawa-ken, both of Japan

[21] Appl. No.: 724,881

[22] Filed: Apr. 19, 1985

[51] Int. Cl.[4] ............................................. H02K 29/12
[52] U.S. Cl. ...................... 318/254; 318/138; 310/68 R; 310/113
[58] Field of Search ............... 318/138, 254 A, 254, 318/439; 310/68 R, 113

[56] References Cited

U.S. PATENT DOCUMENTS

| 3,445,697 | 5/1969 | Costa | 310/113 X |
| 4,080,553 | 3/1978 | Lyman | 318/254 A X |
| 4,256,997 | 3/1981 | Brusaglino et al. | 318/254 |
| 4,385,249 | 5/1983 | Fukushima | 310/113 X |

FOREIGN PATENT DOCUMENTS

| 47-43485 | 11/1972 | Japan | 318/254 |
| 54-20315 | 2/1979 | Japan | 318/254 |
| 57-71258 | 5/1982 | Japan | 318/254 |

Primary Examiner—William M. Shoop, Jr.
Assistant Examiner—Bentsu Ro
Attorney, Agent, or Firm—Pahl, Lorusso & Loud

[57] ABSTRACT

A semiconductor electric motor is disclosed which comprises: an outer housing; a cylindrical magnetic core fixedly mounted to the inside of the outer housing; polyphase armature coils mounted upon the magnetic core; a rotative shaft rotatably held by bearings mounted upon the outer housing; a rotor which is fixed to the rotative shaft and which is excited by exciting coils mounted thereon in such a way that the outer surface is polarized south and north at regular intervals and that the produced magnetic field penetrates through the armature coils; a first core made from a magnetic material and centrally provided with a hole which is made stationary relative to the rotative shaft extending through the hole; a second core made from a magnetic material and fixed inside the outer housing; the first and second cores cooperating with secondary and primary coils respectively mounted upon the first and second cores to constitute a rotary transformer; an RF oscillator consisting of a semiconductor circuit and acting to supply RF alternating current to the primary coil; an electric circuit for rectifying the output from the secondary coil and supplying it to the exciting coils; and an electric current supply control circuit for controlling the electric current supplied to the armature coils to produce a torque in one direction.

12 Claims, 20 Drawing Figures

SEMICONDUCTOR ELECTRIC MOTOR HAVING A ROTARY TRANSFORMER TO EXCITE A ROTOR

BACKGROUND OF THE INVENTION

The present invention relates to a semiconductor electric motor and, more particularly, to a semiconductor electric motor having a novel structure that employs a rotary transformer to excite a rotor that serves as a field magnet, for obtaining position-sensing signals.

Servomotors and other electric motors used in industrial equipments are required to be small, powerful, have a long life and low inertia, and generate low noise. A cylindrical semiconductor electric motor may satisfy these requirements. However, this motor has several disadvantages as follows.

First, Hall effect devices are utilized as elements for sensing positions. This severely limits temperature increase, and hence a small-sized motor of this kind cannot produce a large output.

Secondly, the rotor serving as the field magnet is made of a ferrite magnet. Therefore, the magnet field is not strong. Where a large output is needed, a motor that is fabricated in large size must be provided. Thus, the output increase is limited. Accordingly, where a small-sized, semiconductor motor that produces a large output is necessitated, an expensive sintered magnet using a rare metal must be employed.

Thirdly, if position-sensing devices other than Hall effect devices are used, the motor has a special structure which is not adapted to be mass-produced. Hence, it is expensive to manufacture.

SUMMARY OF THE INVENTION

The above-described drawbacks with the prior art apparatus have been successfully eliminated by the present invention.

It is an object of the present invention to provide a semiconductor electric motor which is small in size but produces a large output, although the rotor acting as the field magnet is made of an ordinary ferrite magnet.

It is another object of the invention to provide a small-sized, lightweight, semiconductor electric motor which is inexpensive to manufacture and which produces large position-sensing outputs.

It is a further object of the invention to provide a semiconductor motor which is adapted to be mass-produced.

These objects are achieved in accordance with the teachings of the present invention by a semiconductor electric motor comprising: an outer housing; a cylindrical magnetic core fixedly mounted to the inside of the outer housing; polyphase armature coils mounted on the magnetic core; a rotative shaft rotatably held by bearings that are mounted on the outer housing; a rotor which is excited by exciting coils mounted thereon in such a way that the outer surface of the rotor is polarized south and north at regular intervals and that the produced magnetic field penetrates through the armature coils, the rotor being fixedly mounted to the rotative shaft; a first core made from a magnetic material and having a central hole which is made stationary relative to the rotative shaft extending through the hole; a second core made from a magnetic material and fixed inside the outer housing; the first and second cores cooperating with a secordary coil and a primary coil respectively mounted to the first and second cores, to constitute a rotary transformer; an RF oscillator consisting of a semiconductor circuit and acting to supply RF alternating current to the primary coil; an electric circuit for rectifying the output from the secondary coil and supplying it to the excited coils; and an electric current supply control circuit for controlling the electric current supplied to the armature coils and producing a torque in one direction.

As means for sensing positions of the rotor, there are additionally provided a plurality of position-sensing coils fixed to a portion of the second core at regular angular intervals, a means which contains a magnetic portion mounted in a portion of the first core and which, when it moves across the plane of the position-sensing coils, changes the induction constant of these coils for changing the inductive outputs from the coils, the outputs acting as position-sensing signals, and the electric current supply control circuit for controlling the electric current supplied to the armature coils and producing a torque in one direction. The position-sensing coils are so disposed that the magnetic field produced by the primary coil penetrates through the coils.

These and other objects of the invention will become apparent from the following description of embodiments thereof when taken together with the drawings.

DETAILED DESCRIPTION OF THE PREFERRED EMBODIMENTS

Figure 1:
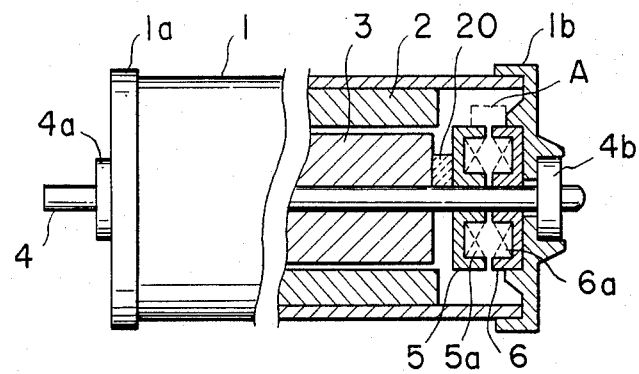
FIG. 1 is a side elevation partially in cross section of a semiconductor electric motor according to the present invention.

Referring to FIG. 1, there is shown a semiconductor electric motor embodying the concept of the present invention. This motor has an outer housing 1, which is only partially shown. A cylindrical, fixed armature core 2 is made of a silicon steel plate and has three-phase armature coils which are mounted thereon by a conventional means. The armature coils are exactly the same as the windings of a three-phase induction motor. A rotor 3 is made by stacking silicon steel plates on top of each other. The center of the rotor 3 is fixed to a rotative shaft 4. As described later, the rotor is polarized south and north at angular intervals of 90° radially. The shaft 4 is supported via ball bearings 4a and 4b on covers 1a and 1b which are mounted on the housing 1. Terminals (not shown) brought out from the armature coils extend out through the housing 1. A pot-shaped core 5 is made from a soft ferrite and is centrally provided with a hole. This hole is made stationary relative to the shaft 4 extending through it. A secondary coil 5a is mounted to the pot-shaped core 5. Another pot-shaped core 6 has its bottom portion fixed to the cover 1b and is centrally formed with a hole. A small space is left between this hole in the core 6 and the shaft 4. The core 6 is also made from a soft ferrite, and a primary coil 6a is mounted to this core 6.

Figures 2A, 2B:
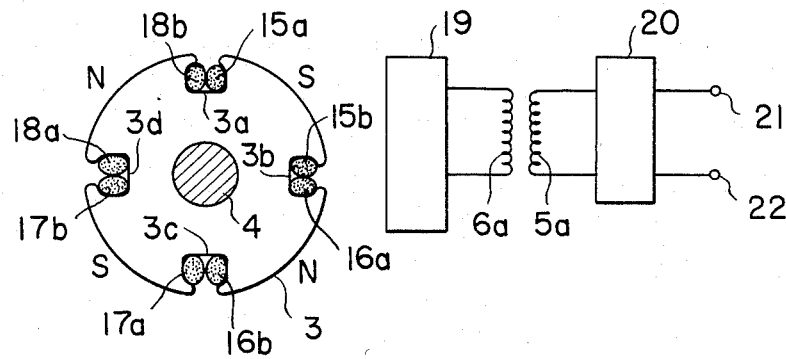
FIG. 2a) is a schematic representation of the rotor of the motor shown in FIG. 1 that includes exciting coils.
FIG. 2(b) is a diagram of a circuit for controlling the excitation of the rotor shown in FIG. 2(a)

Referring to FIG. 2(b), an oscillator circuit 19 consisting of transistors supplies RF alternating current of about 50 KHz to the primary coil 6a. For example, the oscillator circuit of a stroboscopic tube may be used as the oscillator circuit 19 as it is, in which case the primary coil 6a also acts as an oscillator coil.

The output from the secondary coil 5a is rectified by a rectifier circuit 20, which is fixed to the rotor 3 as shown in FIG. 1. The rectified output is furnished to exciting coils 15a, 15b, etc. (see FIG. 2(a)) upon the rotor 3 via terminals 21 and 22. Although the rectified output contains ripples, it is smoothed by the inductances of the coils 15a, 15b, etc.

As shown in FIG. 2(a), the exciting coils 15a and 15b are mounted in slots 3a and 3b, respectively. Exciting coils 16a and 16b are mounted in slots 3c and 3d, respectively. Exciting coils 17a and 17b are mounted in slots 3c and 3d, respectively. Exciting coils 18a and 18b are mounted in slots 3d and 3a, respectively. By exciting these coils in given directions, the rotor is polarized south and north at angular intervals of 90° as shown.

The aforementioned rotor 3 can be mass-produced as well known in the art. The intensity of the magnetic field is just as strong as the intensity of normal commutator motors. Therefore, a magnetic field that is three times or more as strong as the field produced by ferrite magnets can be obtained. Thus, a large output torque is provided.

The open ends of the magnetic path formed by the pot-shaped cores 5 and 6 are disposed opposite to each other with a gap of 0.2 to 0.5 mm therebetween. The efficiency of transmission of electric power is 60% or more. Since the primary coil 6a is excited with RF alternating current, the diameter of the pot-shaped cores necessary to transfer 10 wattages of electric power is only 25 mm or so. For this reason, the invention can be applied to electric motors delivering relatively small outputs. The armature coils mounted on the armature 2 shown in FIG. 1 can constitute a two-phase, three-phase, or other polyphase system. In the present example, the armature coils form a three phase system.

Figure 3:
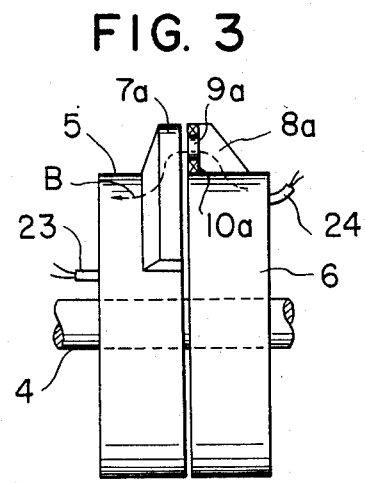
FIGS. 3, 4(a), 4(b) are views showing members of position-sensing devices.

Indicated by reference symbol A in FIG. 1 is a position-sensing device, only main portions of which are particularly shown in FIG. 3, where the openings of the pot-shaped cores 5 and 6 are opposite to each other with a gap therebetween. Wires 23 and 24 are brought out from the primary and secondary coils, respectively. The wires 23 and 24 extend out through an electric circuit 20 and through the outer housing 1.

Figure 4A:
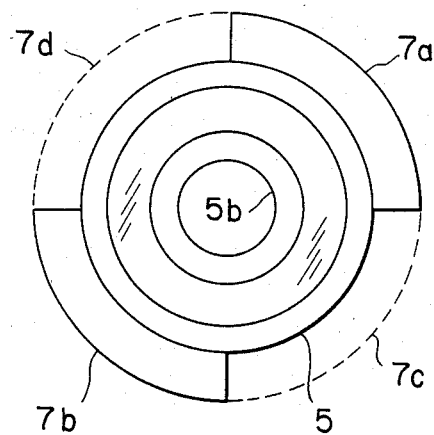
Figure 4B:
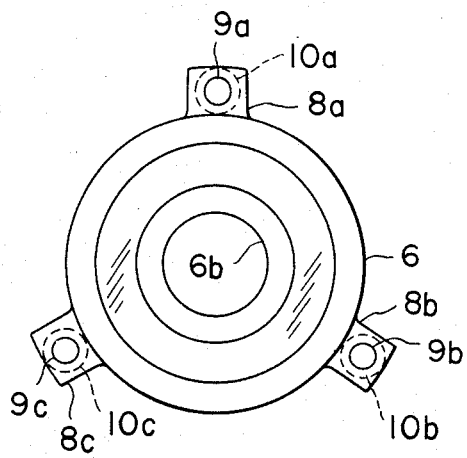

A protrusion 7a made from a soft ferrite is formed on the outside of the pot-shaped core 5, and is particularly shown in FIGS. 3 and 4(a). When the core is formed by molding, protrusions 7a and 7b are formed on the outer periphery at an interval of 90°. As shown in FIG. 3, a protrusion 8a made from a soft ferrite is formed on the outer periphery of the pot-shaped core 6. A protrusion 9a on the left side of the protrusion 8a acts as a magnetic core, on which a position-sensing coil 10a is mounted. The protrusion 8a and two similar protrusions 8b and 8c are formed on the outside of the core 6 at angular intervals of 120°, as shown in FIG. 4(b). Protrusions 9b and 9c are similar to the protrusion 9a. Also, position-sensing coils 10b and 10c are similar in structure and operation to the coil 10a.

The rotative shaft 4 extends through holes 5b and 6b shown in FIGS. 4(a) and 4(b).

The pot-shaped core 5 shown in FIG. 3 rotates together with the rotor 3. During this rotation, when the protrusion 7a, for example, comes to the position in front of the position-sensing coil, a portion of the magnetic flux produced by the primary coil 6a penetrates through the coil 10a as indicated by the dotted line B, setting up an inductive output. When the protrusion 7a is not opposite to the coil, a portion of a reduced magnetic flux gives rise to an inductive output which is weaker than the former inductive output. Therefore, the former output can be used as a position-sensing output signal.

Indicated by broken lines 7c and 7d are intermediate portions between the protrusions 7a and 7b shown in FIG. 4. These portions 7c and 7d are electrically conductive, and face the coil 10a. Thus, the signal-to-noise ratio of the inductive output described above is good due to eddy-current loss.

Other position-sensing devices 8b, 8c, 9b, 9c, 10b, and 10c are exactly the same as the position-sensing device A.

Figure 5:
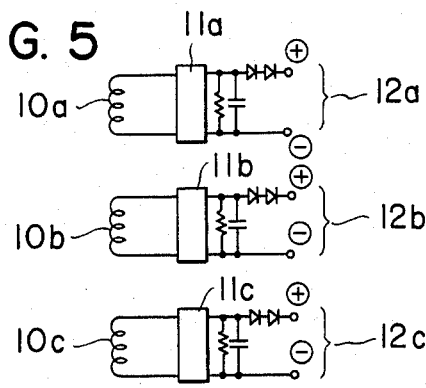
FIG. 5 is a diagram of sensing circuits containing position-sensing coils.

As shown in FIG. 5, the outputs induced in the coils 10a, 10b, and 10c are rectified by rectifying circuits 11a, 11b, and 11c, respectively, and then they are fed as trains of rectangular pulses through terminals 12a, 12b, and 12c via resistors, capacitors, and diodes.

As noted above, the novel semiconductor motor is characterized in that the small-sized rotary transformer which has a large capacitance and makes use of RF alternating current is employed as a source of position-sensing signal that is excellent in signal-to-noise ratio and delivers a large output.

Figure 6:
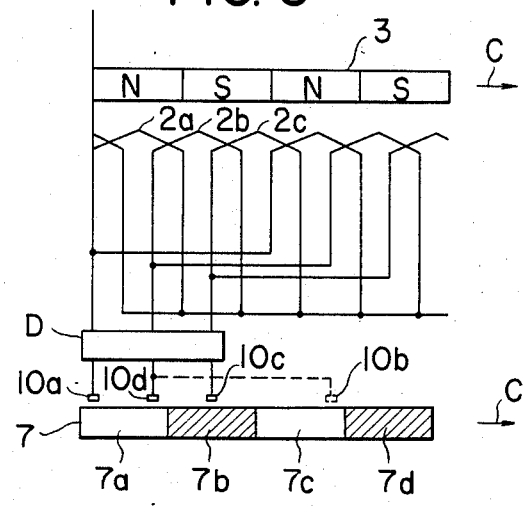
FIG. 6 is an expanded view of the rotor and the armature coils of the motor shown in FIG. 1.

Means for controlling the excitation of the armature coils are next described by referring to FIG. 6, which is an expanded view of the rotor 3, the three-phase armature coils 2a, 2b, 2c mounted on the fixed magnetic core 2 shown in FIG. 1, the protrusions 7a, 7b, and conductive portions 7c, 7d. The rotor 3 comprises south poles and north poles which are spaced apart 90°. Currents through the armature coils 2a–2c are 120° out of phase with each other. The armature coils under the same magnetic pole are connected in parallel to form a Y connection.

When the rotor 3 and the protrusion 7 rotate in the direction indicated by the arrow C, the induction constants of the coils 10a, 10d, 10c that scan the surfaces of the conductive portions 7c, 7d and the magnetic portions 7a, 7b change cyclically, and they differ by an electrical angle of 120°. If the coil 10d is moved to the position of the coil 10b to vary the induction constants, the same result will be obtained. In this alternative example, the coils 10a, 10b, and 10c are spaced apart 120° in the same manner as in the example shown in FIG. 4.

The semiconductor motor is so designed that electric current supply control circuit D is controlled by changing the induction constants of the coils 10a, 10b, 10c, and the armature coils 2a, 2b, 2c are excited to produce a torque for driving the rotor 3 in the direction indicated by the arrow C.

Figure 7:
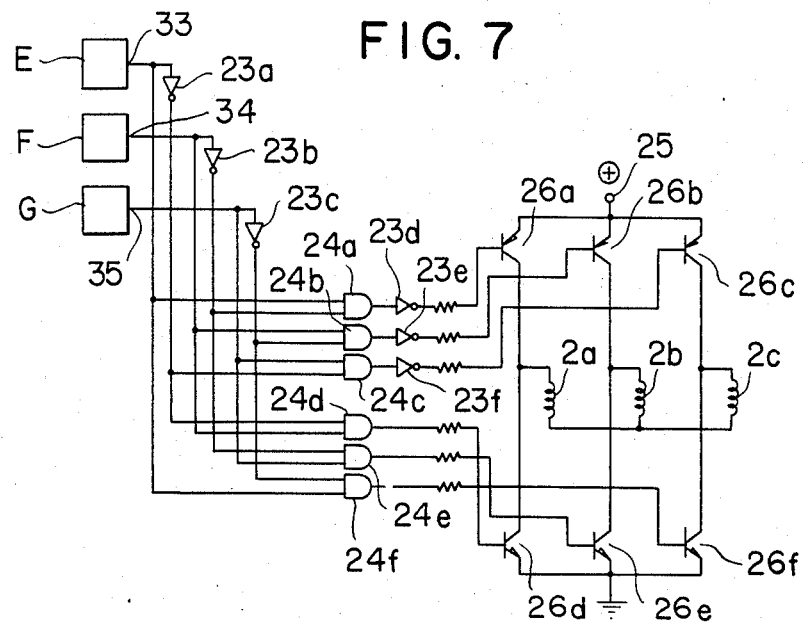
FIG. 7 is a diagram of a circuit for controlling excitation and producing position-sensing outputs from the outputs from the circuit shown in FIG. 5.

The current supply control circuit D is next described in detail by referring to FIG. 7, where the three electric currents shown in FIG. 5 are indicated by reference symbols E, F, and G. They have output terminals 33, 34, 35 which are shown as the terminals 12a, 12b, 12c in FIG. 5. The output waveforms appearing at these terminals are shown in the timing diagram of FIG. 8 and indicated by the same reference numerals. The outputs appearing at the terminals 33, 34, 35 are applied to AND circuits 24a, 24b, . . ., 24f via or without via inverter circuits 23a, 23b, 23c. The output from the AND circuit 24a takes the waveform 27 in FIG. 8. The pulses of this waveform have a pulse duration of an electrical angle of 120°. The pulse separation is 240°. The outputs from the other AND circuits 24b, 24c, 24d, 24e, 24f assume waveforms 28, 29, 30, 31, 32, respectively, in FIG. 8.

The inverter circuits 23d, 23e, and 23f act to allow transistors 26a, 26b, 26c to conduct while the outputs from the AND circuits 24a, 24b, 24c are present. The transistors 26d, 26e, 26f are allowed to conduct while the outputs from the AND circuits 24d, 24e, 24f exist. Indicated by reference numeral 25 is a positive voltage terminal.

Thus, the excitation of the armature coils 2a, 2b, and 2c is controlled in exactly the same manner as in the case of the Y connection of the commutator motor, and a torque is developed to rotate the rotor. In case where the armature coils 2a, 2b, and 2c are connected to form a delta connection and they are excited in the same way, the same result will be obtained. The aforementioned current supply control circuit for the armature coils is used for a three-phase motor. The armature coils of a two-phase motor can also be excited under the control of a similar, known control circuit. In this case, the position-sensing coils 10a, 10b, 10c shown in FIG. 4(b) are reduced to two, which are so disposed that exciting currents are 90° out of phase.

As a modified example, the protrusions 7a, 7b (shown in FIG. 4(a)) made from a soft ferrite and the conductive portions 7c, 7d are removed. The gaps between the coils 10a, 10b, 10c and the protrusions or the area of these gaps is changed in such a way that the RF alternating current applied to the coils 10a, 10b, 10c (on the outer periphery of the pot-shaped core 5) is modulated by a sinusoidal wave which is produced twice per revolution. In this arrangement, the inductive outputs, i.e., the position-sensing signals from the coils, can be effectively used for a known resolver.

Figure 9A:
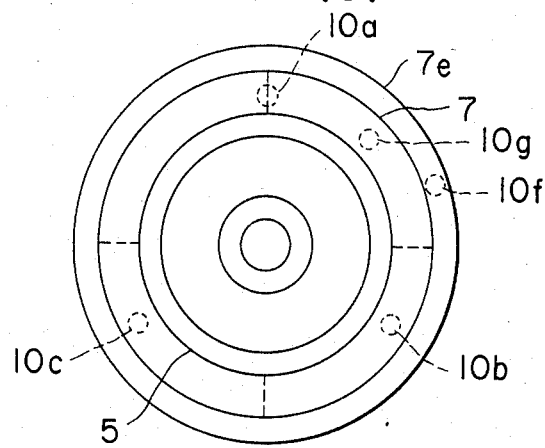
FIG. 9(a) is a view similar to FIG. 4, but showing a modified example of position-sensing device.

Referring next to FIG. 9(a), this modified example is particularly shown, and in which the same components as in the previous example are indicated by the same reference numerals as in the previous figures. The device shown in FIG. 9(a) is a modification of the device shown in FIG. 4(a). This device has a protrusion 7e made from a soft ferrite and takes the form of a flat ring. The protrusion 7e is formed on the outer periphery of the protrusion 7 which is at the position of the protrusions 7a and 7b shown in FIG. 4(a). The protrusion 7 is so shaped that its inner curved surface or the area of this curved surface is approximated by a sinusoidal curve whose peaks and bottoms are indicated by the dotted lines.

The coils 10a, 10b, 10c shown in FIG. 4(b) are opposite to the protrusion 7 having the curved surface. The coil 10f is exactly identical in structure with the coils 10a, 10b, 10c, and is formed on the outer periphery of the core 6 in opposite relation to the ring 7e. The inner curved surface of the protrusion 7 or the area of the surface is so formed that the outputs induced in the coils 10a, 10b, 10c are modulated by the RF alternating current, i.e., the carrier, and that the modulated waves are sinusoidal waves used for detection of positions.

Figure 9B:
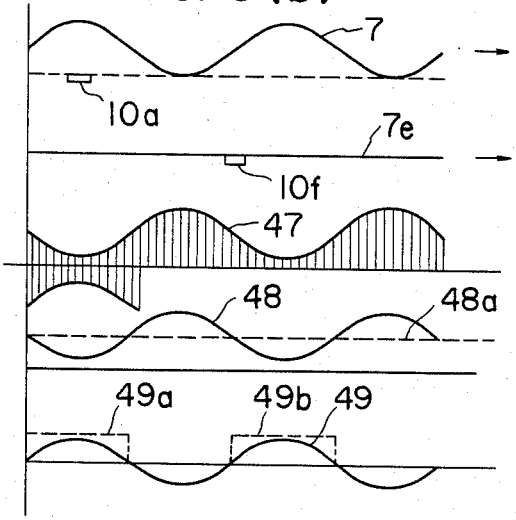
FIG. 9(b) is a graph of the outputs from the coils shown in FIG. 9(a)

The graph of FIG. 9(b) shows the outputs from the coils. The abscissa indicates the angular position of the rotor 3. The curve 7 indicates the curved surface of the protrusion 7, which moves to the right as indicated by the arrow. The coil 10a is placed in the position indicated by the dotted line. Other coils are omitted in this graph.

The output from the coil 10a is modulated by the carrier, i.e., the frequency of the oscillator 19 shown in FIG. 2(b), to a curve 47 shown in the graph. The upper and lower portions of this waveform are symmetrical, but the lower portion is not shown except for its one portion. The coil 10f is opposed to the flat protrusion 7e, which also moves to the right as indicated by the arrow. The output from the coil 10f has a constant amplitude and is modulated.

Figure 9C:
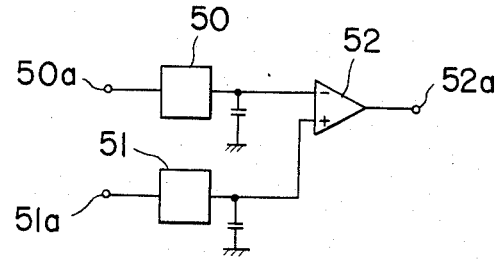
FIG. 9(c) is a diagram of a circuit for rectifying and demodulating the outputs from two coils shown in FIG. 9(a)

The outputs from the coils 10a and 10f are applied to the terminals 50a and 51a (FIG. 9(c)) and then rectified. Thereafter, they are demodulated by synchronous detector circuits 50 and 51 in synchronism with the carrier frequency. The ripple component is removed by a filter, and then they are applied to an operational amplifier 52.

The output waveform at the inverting terminal of the operational amplifier 52 is represented by curve 48 in the graph of FIG. 9(b). The input waveform at the non-inverting terminal is represented by curve 48a. The height of the curve 48a is so adjusted that the upper and lower portions of the curve 48 are symmetrical. Thus, the output waveform at the output terminal 52a of the amplifier 52 is given by a sinusoidal curve 49 in the graph. The output voltages from the coils 10b and 10c can also be shaped into a waveform similar to the sinusoidal curve 49 by the use of control circuits similar to the circuit shown in FIG. 9(c). The shaped waveforms are 120° out of phase.

Figure 8:
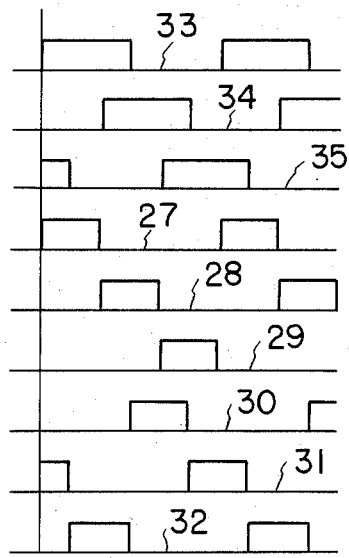
FIG. 8 is a timing diagram of voltages appearing at various locations of the circuit shown in FIG. 7.

The voltages given by the curves 49a and 49b in the graph are taken using circuits that shape their input signals into rectangular waveform, whereby curves similar to the curve 33 shown in FIG. 8 are obtained. These curves can be employed as position-sensing signals. In exactly the same manner, position-sensing signals are derived from the other coils 10b and 10c.

The output from the coil 10g shown in FIG. 9(a) is 90° out of phase with the output from the coil 10a and so a position-sensing signal that is sinusoidal in waveform can be obtained by the same means as the circuit shown in FIG. 9(c). Obviously, the outputs from the coils 10a and 10g can be employed to control the excitation of the two-phase armature coils. Also, it is possible to obtain three-phase, position-sensing outputs based upon the two-phase, position-sensing outputs from the coils 10a and 10g by means of known means.

Since the aforementioned sinusoidal, position-sensing signals are similar to the outputs from the known resolver, the novel apparatus can be used as a function of a resolver.

A further example of the invention is next described in detail by referring to FIGS. 10 and 11, where the same components as those in FIGS. 1, 3, 4(b) are indicated by the same reference numerals as in those previous figures and will not be described below.

Figure 10:
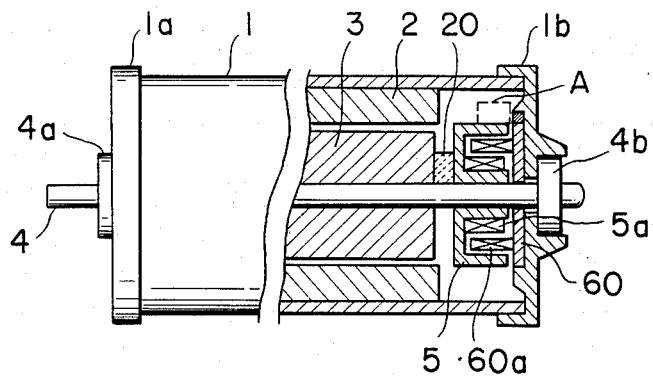
FIG. 10 is a side elevation partially in cross section of another semiconductor electric motor according to the invention.
Figure 11A:
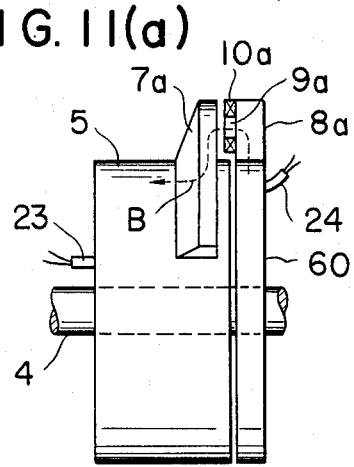
FIGS. 11(a)–11(c) are views showing members of position-sensing devices for use with the motor shown in FIG. 10.

Referring to FIG. 10, a core 60 like a flat board has its side portion fixed to the cover 1b. The rotative shaft 4 extends through the central hole in the core 60 such that a gap is left in it. The right end of a primary coil 60a is securely fixed to the core 60 made from a soft ferrite.

Figure 11B:
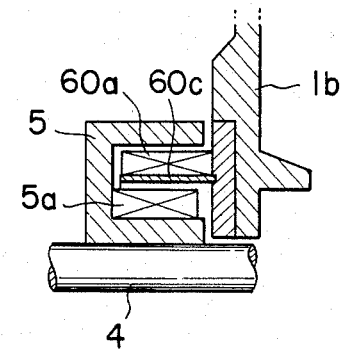
Figure 11C:
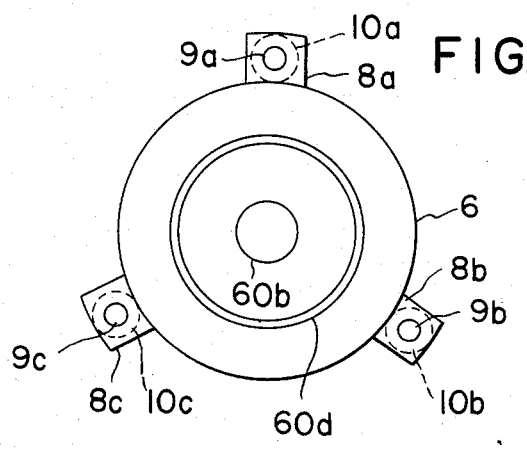

The above-described primary coil and a secondary coil are particularly shown in FIG. 11b, where only the upper portions of the shaft 4 is shown. Note that the upper and lower portions of the shaft are symmetrical. Also notice that the same components as those of the structure shown in FIG. 10 are denoted by the same reference numerals as in FIG. 10. The secondary coil 5a is mounted in the center of the pot-shaped core 5. The primary coil 60a is wound on a cylinder 60c made from a plastic. The right end of the cylinder 60c is fitted in an annular hole 60d (FIG. 11(c)) in the core 60 and rigidly held in that position. The primary coil 60a is held at some distance from both the core 5 and the secondary coil.

As can be understood from the description above, the same objects are achieved by the structure in which the pot-shaped core 5 shown in FIGS. 1 and 2 is shaped like a flat board, and the left end of the secondary coil 5a is rigidly fixed to a side of the core 5. The primary coil 60a is mounted to the pot-shaped core 60. The vertical positions of the primary and secondary coils may be replaced with each other without altering the utility.

A still other example of the invention is next described by referring to FIGS. 12 and 13, where the same components as those in FIGS. 1 and 4 are indicated by the same reference numerals as in FIGS. 1 and 4 and will not be described below.

Figure 12:
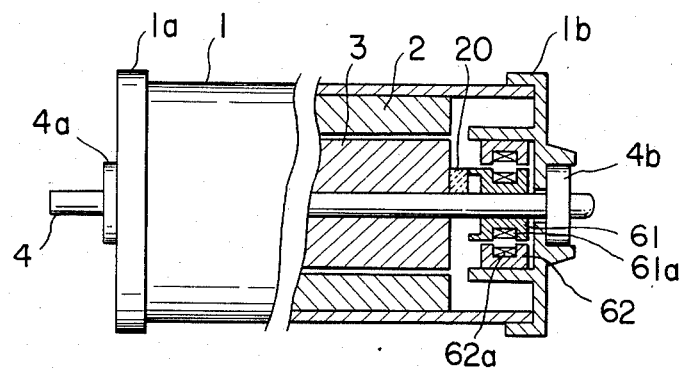
FIG. 12 is a side elevation partially in cross section of a further semiconductor electric motor according to the invention.

Referring to FIG. 12, a core 61 made from a soft ferrite has a central hole which is made stationary relative to the rotative shaft 4 extending through the hole. A secondary coil 61a is wound into a cylindrical form on the outside of the core 61. A core 62 made from a soft ferrite is fixed to the cover 1b. A primary coil 62a is wound into a cylindircal form on the inside of a core 62 by a known method, such as by dividing the core 62. The primary coil 62a and the secondary coil 61a operate in the same manner as the primary coil 6a and the secondary coil 5a, respectively, shown in FIG. 1. The primary and secondary coils and position-sensing coils are particularly shown in FIGS. 13(a) and 13(b).

Figure 13A:
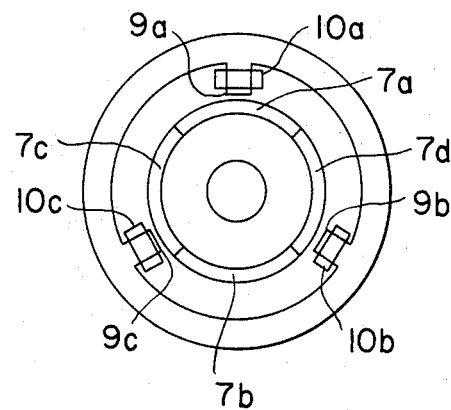
FIGS. 13(a) and 13(b) are views showing members of position-sensing devices for use with the motor shown in FIG. 12.
Figure 13B:
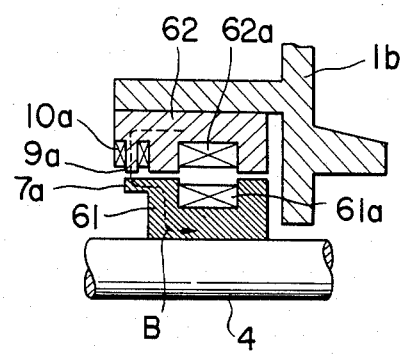

FIG. 13(b) shows only the upper portion of the rotative shaft 4, but the upper and lower portions are designed to be symmetrical. The cores 61 and 62 are disposed opposite to each other with a slight radial gap therebetween.

The core 61 rotates with the rotor 3. During this rotation, when the protrusion 7a, for example, comes to the position in front of the coil 10a, a portion of the magnetic flux produced by the primary coil 62a penetrates through the coil 10a as indicated by the dotted line B, generating an inductive output. When the protrusion 7a does not face the coil 10a, some reduced magnetic flux may produce an inductive output. Since the latter output is weaker, the former output can be used as a position-sensing signal.

FIG. 13(a) is a left side elevation of FIG. 13(b), and in which those indicated by the same reference numerals as those shown in FIG. 4 operate in the same manner as those components in FIG. 4.

The pot-shaped cores and other similar components may also be made from sintered pure iron, silicon steel, or the like without reducing the utility of the invention. As thus far described, the novel motor according to the invention achieves the objects described in the head paragraph and yields practically excellent advantages.

Thus, there is provided in accordance with the invention a semiconductor electric motor which has the advantages discussed above. The embodiments described are intended to be merely exemplary and those skilled in the art will be able to make variations and modifications in them without departing from the spirit and scope of the invention. All such modifications and variations are contemplated as falling within the scope of the appended claims.

What is claimed is:

1. A semiconductor electric motor comprising:
   an outer housing;
   a cylindrical magnetic core fixedly mounted to the inside of the outer housing;
   polyphase armature coils mounted upon the magnetic core;
   a rotative shaft rotatably held by bearings mounted upon said outer housing:
   a rotor which is fixed to said rotative shaft and which is excited by exciting coils mounted thereon in such a way that the outer surface is polarized south and north at regular intervals and that the produced magnetic field penetrates through said armature coils;
   a first core made from a magnetic material and centrally provided with a hole which is made stationary relative to said rotative shaft extending through the hole;
   a second core made from a magnetic material and fixed inside the outer housing;
   the first and second cores cooperating with secondary and primary coils respectively mounted upon said first and second cores to constitute a rotary transformer;
   an RF oscillator consisting of a semiconductor circuit and acting to supply RF alternating current to said primary coil;
   an electric circuit for rectifying the output from said secondary coil and supplying it to said exciting coils; and
   an electric current supply control circuit for controlling the electric current supplied to said armature coils to produce a torque in one direction.

2. A semiconductor electric motor as set forth in claim 1, wherein said rotary transformer is composed of the first core shaped like a pot and made from a magnetic material and the second core shaped like a pot and made from a magnetic material and fixed inside said outer housing, the first core having opposed open ends of magnetic path, the central hole in the first core being made stationary relative to said rotative shaft extending through the hole, the second core being fixed inside said outer housing, 3. A semiconductor electric motor as set forth in claim 1, wherein said rotary transformer is composed of the first core shaped like a pot and made from a magnetic material and having a central hole, the second core taking the form of a flat board and made from a magnetic material, and said primary coil wound into a annular form and received in said first pot-shaped core, the first core having opposed open ends of magnetic path, the central hole in the first core being made stationary relative to said rotative shaft extending through the hole, the second core having a central hole through which the rotative shaft extends with a gap therebetween, the second core being fixed inside said outer housing, the primary coil having one end fixed to the second core, the primary coil overlapping said secondary coil.

4. A semiconductor electric motor as set forth in claim 1, wherein said rotary transformer is composed of the first core taking the form of a flat board and made from a magnetic material and having a central hole, the second core shaped like a pot and made from a magnetic material, and the secondary coil wound into an annular form and received in said pot-shaped second core, the first core having opposed open ends of magnetic path, the central hole in the first core being made stationary relative to said rotative shaft extending through the hole, the second core having a central hole through which the rotative shaft extends with a gap therebetween, the secondary coil having one end fixed to said first core, the secondary coil overlapping said primary coil.

5. A semiconductor electric motor as set forth in claim 1, wherein said rotary transformer is composed of the first core shaped like a bobbin and made from a magnetic material and having a central hole, the second core made from a magnetic material and fixed inside said outer housing, the secondary coil wound on the outside of said first core, and said primary coil wound on the inside of said second core, the first core having opposed open ends of magnetic path, the central hole in the first core being made stationary relative to said rotative shaft extending through the hole, the outer surface of said first core being opposite to the inner surface of the second core with a gap therebetween, the second core having a nonuniform inside diameter.

6. A semiconductor electric motor as set forth in claim 1, wherein said rotary transformer is composed of the first core shaped like a bobbin and made from a magnetic material, the second core made from a magnetic material and fixed inside said outer housing, said secondary coil wound on the outside of said first core, and the primary coil wound on the inner side of said second core, the first core having opposed open ends of magnetic path, the first core having a central hole which is made stationary relative to said rotative shaft extending through the hole, the inner surface of the second core being opposite to the outer surface of the first core with a gap therebetween, the second core having a nonuniform inside diameter.

7. A semiconductor electric motor comprising:
an outer housing;
a cylindrical magnetic core fixedly mounted to the inside of the outer housing;
polyphase armature coils mounted upon the magnetic core;
a rotative shaft rotatably held by bearings mounted upon said outer housing;
a rotor which is fixed to said rotative shaft and excited by exciting coils mounted thereon in such a way that the produced magnetic field penetrates through said armature coils and that the outer periphery is polarized south and north at regular intervals;
a first core made from a magnetic material and having a central hole which is made stationary relative to said rotative shaft extending through the hole;
a second core made from a magnetic core and fixed inside the outer housing;
the first and second cores cooperating with secondary and primary coils respectively mounted upon the first and second cores to constitute a rotary transformer;
an RF oscillator consisting of a semiconductor circuit and acting to supply RF alternating current to said primary coil;
an electric circuit for rectifying the output from said secondary coil and supplying it to said exciting coils;
a plurality of position-sensing coils mounted upon a portion of said second core at certain angular intervals such that the magnetic field produced by said primary coil penetrates through the position-sensing coils;
a means which includes a magnetic portion mounted upon a portion of said first core and which, when it moves across the plane of said position-sensing coils, changes the induction constant of these position-sensing coils to change the inductive outputs from said coils, the outputs acting as position-sensing signals; and
an electric current supply control circuit for controlling the electric currents supplied to said armature coils, according to said position-sensing signals for producing a torque in one direction.

8. A semiconductor electric motor as set forth in claim 7, wherein said rotary transformer is composed of the first core shaped like a pot and made from a magnetic material and having a central hole, the second core taking the form of a flat board and made from a magnetic material, and said primary coil received in said pot-shaped first core and wound into an annular form, the first core having opposed open ends of magnetic path, the central hole in the first core being made stationary relative to said rotative shaft extending through the hole, the second core having a central hole through which the rotative shaft extends with a gap therebetween, the second core being fixed inside said outer housing, the primary coil having one end fixed to said second core, the primary coil overlapping said secondary coil.

9. A semiconductor electric motor as set forth in claim 7, wherein said rotor transformer is composed of the first core taking the form of a flat board and made from a magnetic material, the second core shaped like a pot and made from a magnetic material and having a central hole, and the secondary coil received in said second pot-shaped core and wound into an annular form, the first core having opposed open ends of magnetic path, the first core having a central hole which is made stationary relative to said rotative shaft extending through the hole, the second core being fixed inside said outer housing, the second core having a central hole through which said rotative shaft extends with a gap therebetween, the secondary coil having one end fixed too said first core, the secondary coil overlapping said primary coil.

10. A semiconductor electric motor as set forth in claim 7, wherein said rotary transformer is composed of the first core shaped like a pot and made from a magnetic material and having a central hole and the second core shaped like a pot and made from a magnetic material and having a central hole through which said rotative shaft extends with a gap therebetween, the first core having opposed open ends of magnetic path, the central hole in the first core being made stationary relative to the rotative shaft extending through the hole, the second core being fixed inside said outer housing.

11. A semiconductor electric motor as set forth in claim 7, wherein said magnetic portion in said means consists of a plurality of sections the number of which corresponds to the number of the magnetic poles of said rotor, whereby said position-sensing signals are obtained as rectangular pulses.

12. A semiconductor electric motor as set forth in claim 7, wherein said magnetic portion in said means is so formed that the gap between said position-sensing coils and the magnetic portion or the area can be changed, whereby said position-sensing signals are obtained as sinusoidal waves.

* * * * *